Aug. 11, 1964 S. R. KUKULSKI 3,144,571
ELECTROMAGNETIC MOTOR HAVING OPPOSITELY OSCILLATING ARMATURES
Filed Dec. 23, 1960 3 Sheets-Sheet 1
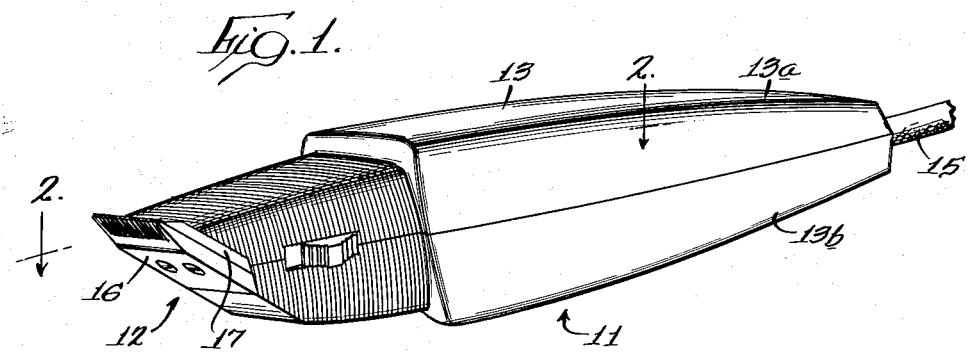
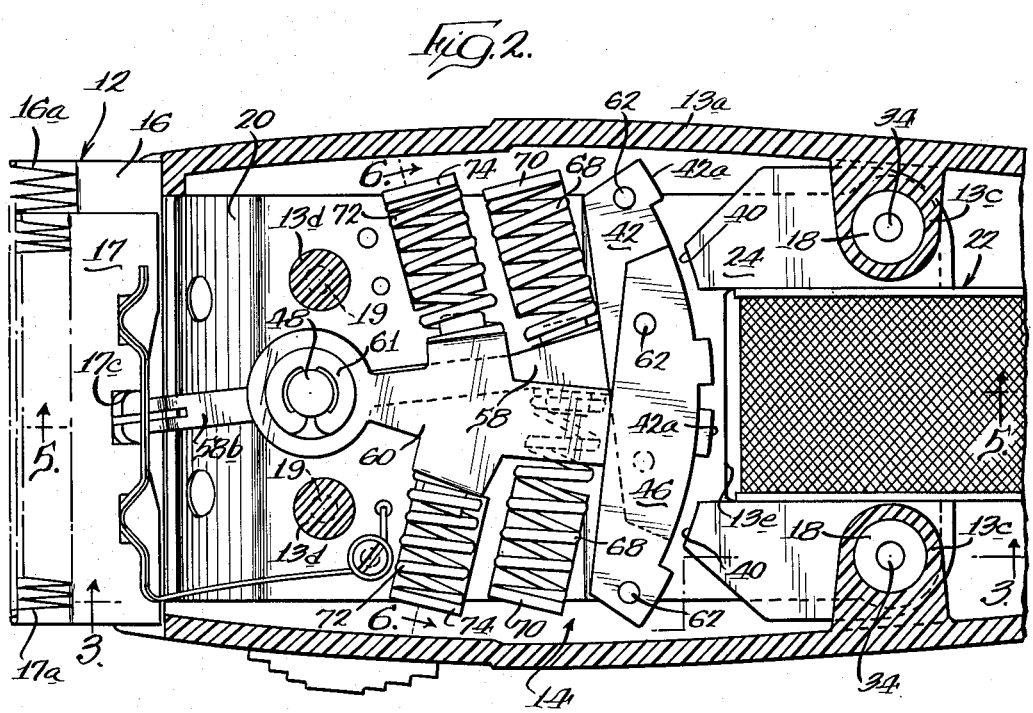
INVENTOR:
Sigmund R. Kukulski
BY
George R. Clark
Atty

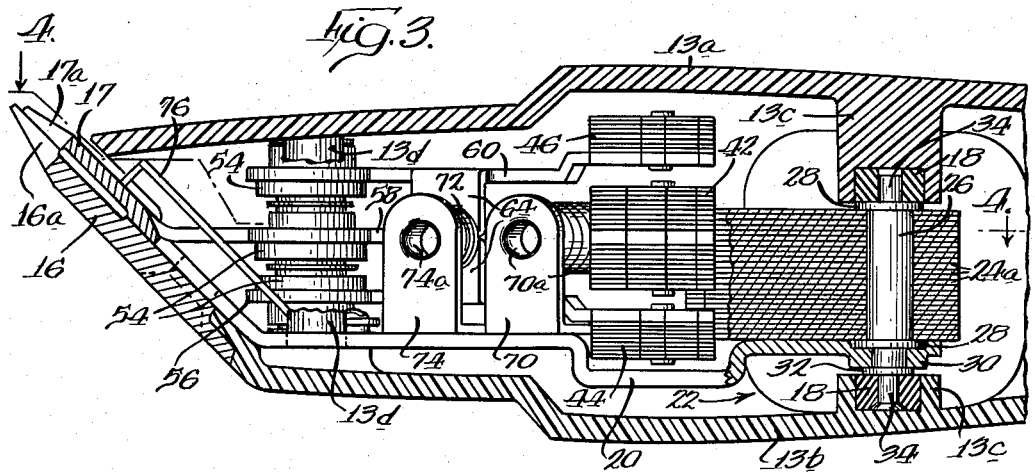
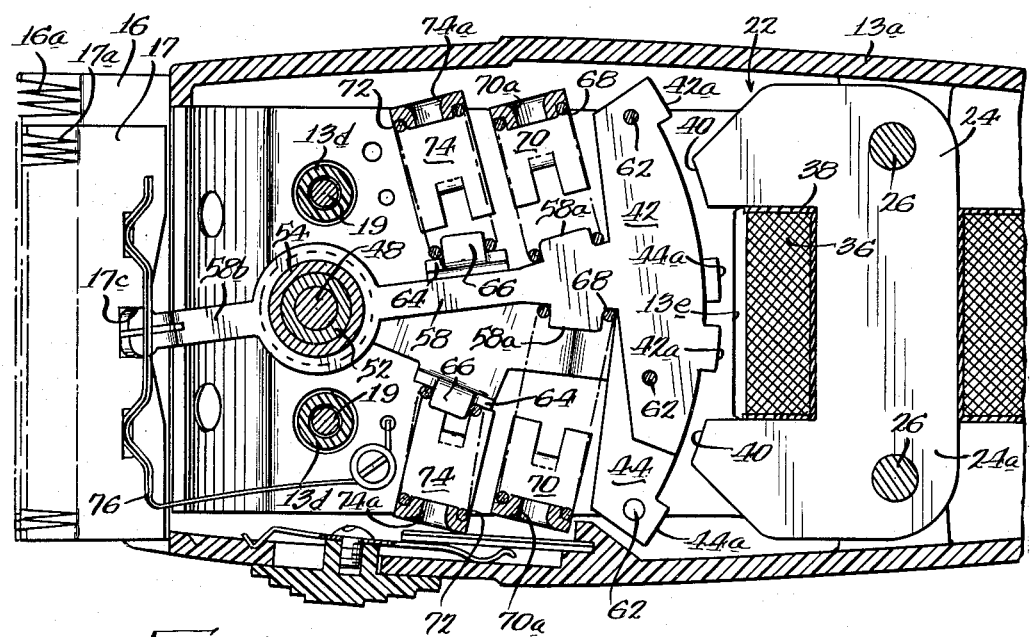

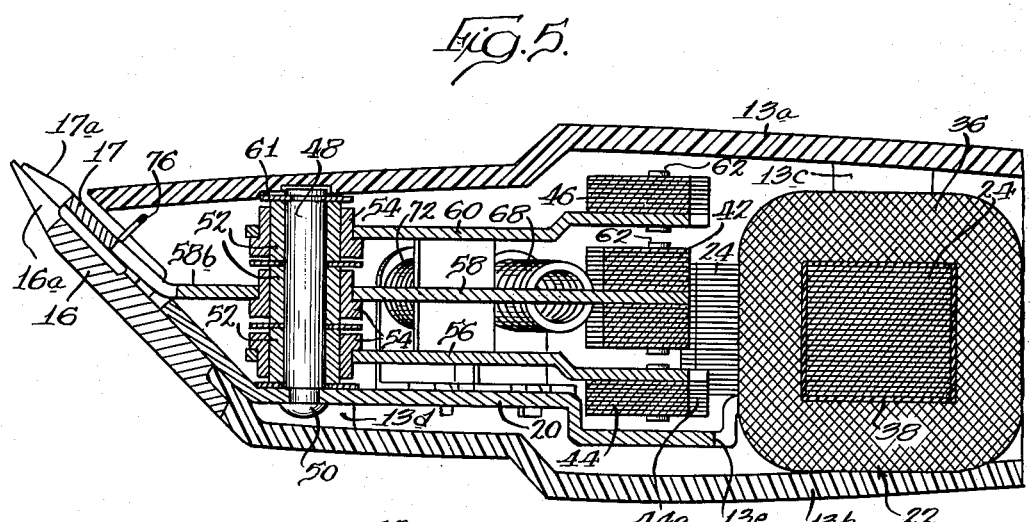
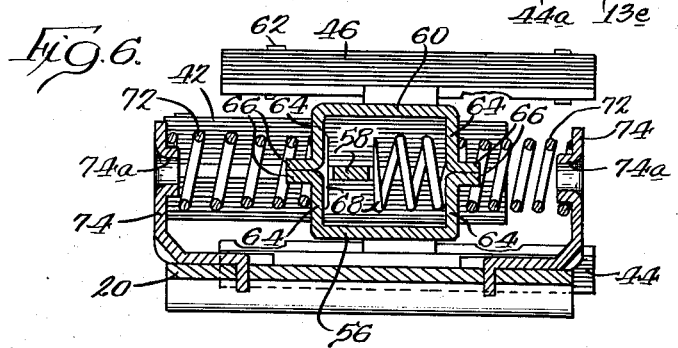
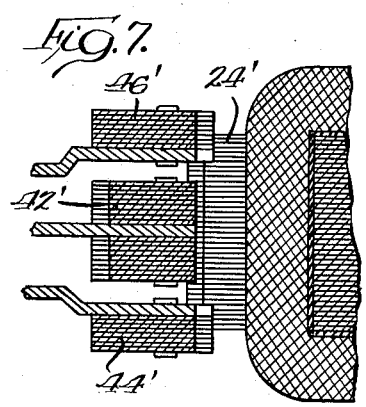
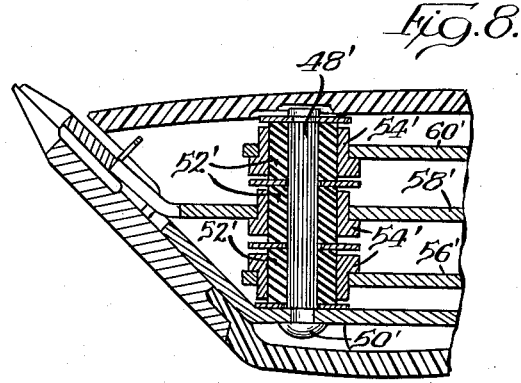
INVENTOR:
Sigmund R. Kukulski
BY
George R. Clark
Atty United States Patent Office 3,144,571
Patented Aug. 11, 1964

3,144,571
ELECTROMAGNETIC MOTOR HAVING OPPO-
SITELY OSCILLATING ARMATURES
Sigmund R. Kukulski, Chicago, Ill., assignor to Sunbeam
Corporation, Chicago, Ill., a corporation of Illinois
Filed Dec. 23, 1960, Ser. No. 78,028
8 Claims. (Cl. 310—29)

The present invention relates to electromagnetic motors and more particularly to electromagnetic motors of the type having an oscillating armature.

The electromagnetic motor of the type employing an oscillating armature has many applications in small portable hand operated implements. There are many attractive aspects of this type of motor including its simplicity, its long maintenance-free life and its low cost. One of the major drawbacks to its use has been the vibration associated with the motor. The oscillating armature produces a reaction force or vibration in the motor and its mounting. When such a motor is used in small hand tools or implements, such as dry shavers, hair clippers and the like, this vibration is very objectionable to the user.

In Jepson United States Pat. No. 2,299,952, which is assigned to the same assignee as the instant application, there is disclosed an electromagnetic motor in which the armature is mounted by means of a reed-like spring member. To minimize the vibration effects on the vibrating armature in that motor, there is provided an idler armature which was designed to vibrate in the opposite direction from the driving armature. The electromagnetic motor of the present invention differs from the one disclosed in the above-mentioned patent in that the armature is pivotally supported by means of a rigid arm rather than a flexible spring. My copending application No. 544,212, filed November 1, 1955, on an Electrically Operated Hair Clipping and Shaving Device, discloses a motor of the type having the armature pivotally supported by a rigid arm. Various methods of minimizing vibration are disclosed in my copending application. The present invention involves a different approach to the elimination of vibration in this type of electromagnetic motor.

It is accordingly an object of the present invention to provide an improved electromagnetic motor in which vibration forces have been eliminated.

It is a further object of the present invention to provide an electromagnetic motor having two oscillating armatures which move in opposite directions to balance out vibrations.

It is an additional object of this invention to provide balancing means in an electromagnetic motor to eliminate vibration caused by the oscillating armature.

It is another object of this invention to provide an improved hair cutting device having an oscillating armature and including an opposed oscillating member to eliminate vibration effects.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIGURE 1 is a perspective view of a hair clipper embodying my invention;

FIGURE 2 is an enlarged, fragmentary sectional view of the hair clipper taken on the line 2—2 of FIGURE 1;

FIGURE 3 is a sectional view of the hair clipper taken on the line 3—3 of FIGURE 2;

FIGURE 4 is a sectional view of the hair clipper taken on the line 4—4 of FIGURE 3;

FIGURE 5 is a sectional view of the hair clipper taken on the line 5—5 of FIGURE 2;

FIGURE 6 is a fragmentary sectional view of the hair clipper motor taken on the line 6—6 of FIGURE 2;

FIGURE 7 is a fragmentary sectional view of the field and armature laminations of another embodiment of the motor; and FIGURE 8 is a fragmentary sectional view of the bearing for the armature supporting arms of another embodiment of the motor.

The present invention is concerned with an electromagnetic motor of the type having an armature mounted for oscillation in a pulsating magnetic field. To eliminate undesirable vibration effects which are characteristic of this type of motor, two opposed oscillating armatures are utilized. The opposed armatures are mounted to oscillate about a common axis and are so arranged relative to each other that they completely neutralize external vibration and any twisting moments around the pivotal support.

Referring now to the drawings, there is illustrated an electric hair removing device generally designated by the reference numeral 11. Essentially this electric hair removing device or hair clipper 11 comprises a suitable shearing head 12 which is removably mounted at one end of a casing 13. Enclosed within the casing 13 is an electromagnetic motor designated generally by reference numeral 14. The casing 13 includes upper and lower cup-shaped casing halves 13a and 13b, respectively, which are secured together by suitable assembly means to form the housing within which the motor 14 is received. A suitable two-conductor cord 15 is provided to connect the motor 14 to a source of power.

The shearing head 12 includes a fixed lower shear plate or comb 16 having teeth 16a projecting from the forward edge thereof. Mounted in sliding engagement with the upper surface of the comb 16 is an upper shear plate or cutter 17. The cutter 17 includes teeth 17a formed along the forward edge thereof and adapted to engage the comb teeth 16a and cooperate therewith in the shearing or clipping of hair.

To support the motor 14 within the casing 13, there are formed integrally with the casing halves projections 13c which are adapted to receive motor supporting pads 18. The pads 18 are made of hard rubber or other resilient material and have centrally located bores to receive and support projecting portions of the motor 14. The forward end of the casing has additional integral projections 13d which extend from both halves into abutting relation and enclose assembly screws 19 which retain the casing halves in assembled relation. The motor 14 is, therefore, readily removable from the casing 13 by merely disassembling casing halves 13a and 13b.

The various portions of the motor 14 are assembled together and mounted on a frame member 20 which is formed of a nonmagnetic material such as brass or the like. Mounted toward one end of the frame member 20 is a U-shaped motor field 22 which includes a laminated core 24 made up of U-shaped laminations 24a. The laminations 24a are of a magnetic material and are retained in assembled relation by means of assembly posts 26 which are staked over at 28 against the outer laminations. The frame member 20 is formed with drawn depressions 30 into which the lower staked portions 28 are received. When the field core 24 is assembled to the frame 20, the lower ends of the assembly posts 26 extend through openings in the frame 20 and are staked over as shown at 32 to retain the field assembled to the frame member 20, as may best be seen in FIG. 3. Extending beyond the staked portions 28 at the upper side of the motor and the staked portions 32 at the lower side of the motor, there are end portions 34 of the assembly posts 26 which are of reduced diameter and which engage the supporting pads 18 mounted in the casing 13.

Received on the bight portion of the U-shaped core 24, there is a field coil 36 which includes many turns of fine insulated copper wire wound on a plastic insulating bobbin 38. Suitable means are provided to connect the field coil 36 with the power cord 15. The frame member 20 is provided with a cut out portion 13e which is for clearance purposes and permits the field coil 36 and its bobbin 38 to extend through frame member 20. Each of the free ends of the U-shaped core 24 is tapered toward a cylindrical pole face 40.

Positioned within the magnetic field produced by the field 22 are a pair of armature members 42 and 44. As may best be seen in FIG. 4, the upper armature member is designated by reference numeral 42 and may be considered the driving armature. The lower armature member designated by reference numeral 44 is designated the secondary armature. Associated with the secondary armature 44 is a counterweight 46. As may best be seen in FIG. 3, the driving armature 42 is substantially thicker than the secondary armature 44 and is positioned between the secondary armature 44 and the counterweight 46.

To pivotally support the armatures 42 and 44 and the counterweight 46, a stub shaft 48 is secured to the frame member 20. The lower end of the shaft 48 is of reduced diameter and extends through an opening in the frame member 20. The lower end of the shaft 48 has a peened over portion 50 to retain it in assembled relationship to the frame member 20. Received on the shaft 48 are three sleeve bearings 52. Three separate bushings 54 are journalled for rotation on the sleeve bearings 52. The secondary armature 44 is supported for oscillation about the shaft 48 by means of an arm 56 which is secured to the lowermost bushing 54 by brazing or other suitable means. The driving armature 42 is supported for oscillation about shaft 48 by means of a driving arm 58 which is secured to the center bushing 54. The uppermost bushing 54 has secured thereto a third arm 60 which supports the counterweight 46. It may be seen, therefore, that the shaft 48, the sleeve bearings 52 and their associated bushings 54 support the three arms 56, 58 and 60 for oscillation about a common axis. The three bushings 54 are spaced apart by washers and retained on shaft 48 by means of a resilient C-washer 61 which is snapped into a groove in the end of shaft 48.

The armatures 42 and 44 are formed of laminated magnetic material assembled together to their respective supporting arms by means of rivets 62. While the counterweight 46 is also shown to be formed of laminated material, it should be understood that it may be made of any suitable nonmagnetic material. The only requirement as to the counterweight 46 is that it be substantially equal in weight to the secondary armature 44 and that the combined weight of the secondary armature 44 and the counterweight 46 be substantially equal to the weight of the driving armature 42.

The armatures 42 and 44 may be characterized as salient pole armatures each armature being provided with a pair of salient poles 42a and 44a, respectively. The faces of the salient poles 42a and 44a are of cylindrical shape as are the field pole faces 40. The axis of the cylindrical surfaces defining the various pole faces is coincident with the axis of the shaft 48 about which the armatures rotate. It should be understood, therefore, that the pole faces 40 and 42a and 44a are formed to permit the armatures 42 and 44 to rotate into as close proximity to the field core 24 as is possible with reasonable manufacturing tolerances. A small air gap between the armature and field is necessary for maximum efficiency. The pole faces 42a and 44a are essentially the same width as the field pole faces 40. In addition, the pairs of salient poles 42a and 44a are circumferentially spaced on their respective armatures a distance equal to the distance between the field pole faces 40. Thus, when the salient poles of the armatures are brought into alignment with the field poles a minimum reluctance path to the passage of magnetic flux is provided.

In order to tie together the arms 56 and 60 which support the secondary armature 44 and counterweight 46, respectively, both of the supporting arms are formed with inwardly extending legs 64. At a point equidistant between the arms 56 and 60, the inwardly extending legs 64 are formed outwardly and brazed together to form outwardly extending projections 66 as is best seen in FIG. 6. With the arms 56 and 60 tied together by means of the legs 64, the secondary armature 44 drives the counterweight 46.

The two armatures 42 and 44 are provided with spring means biasing them to rest or neutral positions in which their salient poles are out of alignment with the field pole faces. To bias the driving armature 42 to the neutral position or rest position, there is provided a pair of helical springs 68 as may best be seen in FIG. 2. To support the springs in biasing position, the frame member 20 has a pair of tabs 70 riveted thereto with one leg of each tab extending upwardly at an angle of 90 degrees to the plane of the frame member 20. To position the springs 68 on the face of the tabs 70, the tabs are formed with drawn projections 70a which extend within the initial turns of the helical springs 68. The ends of the springs 68 away from the tabs 70 engage the drive arm 58 adjacent the armature 42. To locate the inner ends of the springs 68 with respect to the drive arm 58, the integrally formed protuberances 58a on the arm 58 extend into the turns of the springs 68. In addition to the biasing springs 68 provided for the driving armature 42, there is a second pair of helical springs 72 which bias the secondary armature to its neutral position. A second set of spring supporting tabs 74 extend upwardly from frame member 20 to engage the outer ends of the helical springs 72. The tabs 74 are formed with drawn projections 74a which serve the same purpose as the projections 70a described in connection with tabs 70. The inner ends of the helical springs 72 are received on the outward projections 66 described above in connection with the legs interconnecting the arms 56 and 60. With the springs 72 thus engaging the connecting legs 64, the biasing force on the secondary armature and counterweight assembly is directed along the same plane as the center of mass moves as the assembly oscillates. This arrangement prevents any twisting forces from being exerted on the supporting shaft 48.

The considerations involved in the spring design with regard to the frequency of energization of the coil 36 are discussed in my copending application mentioned above. It should be understood, however, that the motor will normally be designed to operate on 60 cycles per second alternating current driving the armatures at double that frequency or 120 cycles per second. The natural frequency of oscillation of any one of the armatures and its associated springs will be somewhat above or below 120 cycles to obtain uniform oscillation and relatively high efficiency.

To drive the cutter 17, the driving arm 58 has forwardly extending portion 58b which drivingly engages the cutter 17. The end of the forward portion of the driving arm 58 is turned upwardly at an angle corresponding to the angle of the cutter and is formed with a rounded end thereon. This rounded end drivingly engages a slot 17c formed in the cutter 17. To apply tension between the comb 16 and the cutter 17, a cutter spring 76 is secured to the frame member 20 and engages the cutter 17 to apply pressure downwardly on the upper surface thereof.

It should be understood that the electromagnetic motor described herein is equally well adapted to use in other hand tools or implements and may have particular application to dry shavers as well as hair clippers. If the motor were applied to a dry shaver having more than one shaving head, the secondary armature might be used to drive one of the shaving heads while the other armature would be used to drive the other shaving head. Such an arrangement is illustrated by the fragmentary sectional view of FIG. 7. The number of laminations have been increased to provide a core 24' which is thicker than the core 24 shown in the other figures. Three armatures 42', 44' and 46' are positioned to oscillate within the magnetic field produced adjacent the core 24'. The armatures 42', 44' and 46' are of magnetic material and may be of the same dimensions and mounted for oscillation in the same way as armatures 42 and 44 and counterweight 46 described above. It is appreciated, therefore, that while the secondary armature in the disclosed embodiment merely serves as a counterbalancing means to eliminate vibration, it may be used as a driving armature by merely increasing the number of laminations and adapting the field to apply additional torque to the secondary armature. Thus, the magnetic force applied to the two piece secondary armature including armatures 44' and 46' would be made equal to the torque applied to the driving armature 42. The supporting arm for either the armature 44' or 46' may be extended to drive a second shearing head.

There is illustrated in FIG. 8 a variation in the structure for supporting the armatures and biasing them to their rest or neutral positions. The armatures are supported or carried by arms 58', 56' and 60', respectively. As in the previous embodiment, the arms are brazed or otherwise secured to bushings 54'. It should be noted, however, that the inside diameter of the bushings 54' is considerably greater than the inside diameter of the bushings employed in the above-described embodiment.

The larger inside bushing diameter is to allow sufficient space for a combined bearing and biasing means 52' which supports each of the bushings 54'. The three rubber bearings 52' are received on a stub supporting shaft 48' which is assembled to the frame by a peened over portion 50'. The outer surface of the shaft 48' is serrated to prevent relative rotation between the inside diameter of the rubber bearings 52' and the shaft 48' to which they are cemented. Similarly, the outer periphery of each rubber bearing 52' is secured against rotation relative to one of the bushings 54' by either cementing or vulcanizing the rubber to the inside diameter of the bushing 54'.

In operation, the rubber bearings 52' are deformed as the armatures 42, 44 and 46 are attracted to their aligned positions with respect to the field core 24'. When the field is deenergized, the rubber bearings 52' serve the same function as the springs 68 and 72 in biasing the armatures. It should be understood, therefore, that with the use of the rubber bearings 52', the springs 68 and 72 are no longer necessary. Not only do the rubber bearings 52' eliminate the four helical springs, but they also provide a frictionless bearing in which no wear will occur and the life of which will be limited only by the period during which the rubber retains its resiliency.

In claiming my invention the term armature or armature means will be used to described either the driving armature 42 or the secondary armature 44 which may also include the counterweight 46.

While there have been illustrated and described particular embodiments of an electromagnetic motor for a hair clipping or shearing device, it will be appreciated that numerous changes and modifications thereof will occur to those skilled in the art, and it is intended in the appended claims to cover all those changes and modifications that fall within the true spirit and scope of the present invention.

What is claimed as new and desired to be secured by Letters Patent of the United States is:

1. A vibratory electromagnetic motor comprising a frame member supporting a plurality of pivotally mounted armature means, each said armature means being of magnetic material and having a pair of circumferentially spaced salient poles, a field core carried by said frame member and including a pair of pole faces spaced to correspond to the spacing of said salient poles, a coil encircling said field core, spring means biasing each said armature means to a rest position in which said salient poles are out of alignment with said pole faces, the rest positions of said armature means being on opposite sides of said pole faces whereby energization of said field coil pivots said armature means in opposite directions toward a second position in which said salient poles are aligned with said pole faces.

2. A vibratory electromagnetic motor as set forth in claim 1 in which said armature means are of equal mass and balance out vibrations in said motor.

3. A vibratory electromagnetic motor as set forth in claim 1 wherein said plurality of armature means comprises a driving armature and a balancing armature mounted for oscillation about a common axis, said balancing armature including an armature portion spaced axially on one side of said driving armature and a balance weight connected to said armature portion and positioned on the other side of said driving armature.

4. A vibratory electromagnetic motor comprising a frame of nonmagnetic material, a laminated U-shaped field core mounted on said frame and having a pair of spaced pole faces, said core having a field coil encircling the bight portion thereof, a shaft carried by said frame and pivotally supporting two armatures, said armatures formed of laminated magnetic material and each having a pair of salient poles extending radially at spaced positions on the periphery thereof, said armatures being pivotal into an aligned position in which said poles are aligned with and adjacent to said field pole faces, spring supports extending from said frame, coil springs interposed between said armatures and said supports to bias said armatures to their rest positions, the rest positions of said armatures being on opposite sides of said aligned position whereby energization of said coil by an alternating current causes said armatures to oscillate in opposed relation to reduce motor vibration.

5. A vibratory electromagnetic motor comprising a frame of nonmagnetic material, a laminated U-shaped field core mounted on said frame and having a pair of spaced pole faces, a field coil on said core, a pair of armatures pivotally supported by said frame on a common axis, one of said armatures being the driving armature, a counterweight integrally connected to the other armature, the mass of said counterweight and said other armature equaling the mass of said driving armature, said driving armature being positioned between said other armature and said counterweight, each said armature having salient poles of magnetic material which may be simultaneously aligned with said field pole faces, means biasing said armatures to rest positions with said projections on each armature out of alignment with said field pole faces whereby energization of said coil by a pulsating current causes said armatures to oscillate in opposite directions.

6. A hair clipping device comprising a housing, a shearing head secured to one end of said housing, a motor enclosed in said housing and operatively connected to said shearing head, said motor including a frame member supporting a motor field and a plurality of armature means, said motor field having a U-shaped core with a coil encircling a portion thereof, the free ends of said U-shaped core forming spaced pole faces toward which said armature means are attracted, means pivotally mounting said armature means on said frame member, circumferentially spaced salient poles on each armature means movable into alignment with said field pole faces, spring means biasing said armature means to rest positions in which said salient poles are pivoted out of alignment with said pole faces, the rest positions of said armature means being in opposite directions from said poles whereby energization of said coil pivots said armature means against said spring means in opposite directions into alignment with each other and into alignment with said pole faces.

7. An electric motor comprising a frame member supporting a pair of armatures for oscillation about a common axis, said armatures each having at least two circumferentially spaced salient poles, spring supporting means connected to said frame, a pair of helical springs engaging each armature and said supporting means to bias said armatures to neutral positions with said salient poles out of alignment with said pole faces, and coil means on said field member for producing a pulsating magnetic field to pivot said armatures in opposite directions from said neutral positions to align said salient poles and said pole faces.

8. A vibratory electromagnetic motor comprising a frame member, a shaft carried by said frame member, a driving armature and a secondary armature pivotally supported on said shaft, a motor field secured to said frame and having a pair of spaced pole faces adjacent said armatures, said armatures each having a pair of salient poles circumferentially spaced for alignment with said field pole faces, spring means biasing said armatures to rest positions with said salient poles pivoted in opposite directions out of alignment with said field pole faces, said motor field pivoting said armatures and salient poles into alignment with said field pole faces, and counterbalance means secured to said secondary armature and movable therewith, said driving armature being positioned between said secondary armature and said counterweight.

References Cited in the file of this patent
UNITED STATES PATENTS

| | | |
|---|---|---|
| 1,891,486 | Wahl | Dec. 20, 1932 |
| 2,239,931 | Prescott | Apr. 29, 1941 |
| 2,245,981 | Knopp | June 17, 1941 |
| 2,299,952 | Jepson | Oct. 27, 1942 |
| 3,072,809 | Jepson et al. | Jan. 8, 1963 |